United States Patent
Ferrel et al.

(10) Patent No.: US 10,198,224 B1
(45) Date of Patent: Feb. 5, 2019

(54) SCHEDULING HIGH PRIORITY PRINT JOBS WITH MINIMAL PRINT WASTE

(71) Applicants: Karen Harrison Ferrel, Longmont, CO (US); Michael Stewart McDermott, Longmont, CO (US); Kenneth Stuart Shouldice, Firestone, CO (US); John Thomas Varga, Longmont, CO (US); David Ward, Broomfield, CO (US)

(72) Inventors: Karen Harrison Ferrel, Longmont, CO (US); Michael Stewart McDermott, Longmont, CO (US); Kenneth Stuart Shouldice, Firestone, CO (US); John Thomas Varga, Longmont, CO (US); David Ward, Broomfield, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/942,805

(22) Filed: Apr. 2, 2018

(51) Int. Cl.
*G06F 3/12* (2006.01)

(52) U.S. Cl.
CPC .......... *G06F 3/1219* (2013.01); *G06F 3/1259* (2013.01); *G06F 3/1263* (2013.01)

(58) Field of Classification Search
CPC .............................. G06F 3/126; G06F 3/1263
See application file for complete search history.

(56) References Cited

U.S. PATENT DOCUMENTS

| | | | |
|---|---|---|---|
| 5,970,223 A | 10/1999 | Debes et al. | |
| 7,265,855 B2 | 9/2007 | Patton | |
| 7,339,688 B1 | 3/2008 | Baba et al. | |
| 7,548,335 B2 | 6/2009 | Lawrence et al. | |
| 8,015,053 B2 | 9/2011 | Manchala et al. | |
| 8,542,381 B2 | 9/2013 | Carney et al. | |
| 8,619,277 B2 | 12/2013 | Kang et al. | |
| 9,007,619 B2 | 4/2015 | Yamazaki | |
| 2005/0128504 A1 | 6/2005 | Bischel et al. | |
| 2008/0144100 A1* | 6/2008 | Tomii ...................... | G06F 3/121 358/1.15 |

(Continued)

FOREIGN PATENT DOCUMENTS

CN    104850367 A    8/2015

OTHER PUBLICATIONS

Patrick Moratori et al., Fuzzy Approaches for Robust Job Shop Rescheduling; IEEE 2010.

(Continued)

*Primary Examiner* — Benjamin O Dulaney
(74) *Attorney, Agent, or Firm* — Duft & Bornsen, PC

(57) ABSTRACT

Systems and methods are provided for scheduling high priority print jobs with minimal paper waste. One embodiment is a printing system that includes a print controller having a print data path with intermediate queues and a last queue to store print ready bitmap data. The print controller monitors the last queue to determine an estimate time for printing the print ready bitmap data stored in the last queue, determines whether the estimate time exceeds a time threshold, and determines whether a high priority print job is detected in the job storage system. In response to determining that the estimate time exceeds the time threshold and detecting the high priority print job, the print controller halts processing of at least one of the plurality of print jobs that is not the high priority print job, and advances processing of the high priority print job on the print data path.

20 Claims, 6 Drawing Sheets

(56) References Cited

U.S. PATENT DOCUMENTS

| | | | |
|---|---|---|---|
| 2009/0059053 A1* | 3/2009 | Ishikawa | H04N 5/23216 |
| | | | 348/333.11 |
| 2009/0091774 A1* | 4/2009 | Burkes | G06K 15/02 |
| | | | 358/1.13 |
| 2012/0057191 A1* | 3/2012 | Gnanasambandam | ............ |
| | | | G06F 3/1211 |
| | | | 358/1.15 |
| 2012/0069374 A1* | 3/2012 | Sasakura | G06K 15/1809 |
| | | | 358/1.13 |
| 2012/0222036 A1* | 8/2012 | Yoshimura | H04N 1/0092 |
| | | | 718/103 |
| 2014/0068621 A1* | 3/2014 | Sitaraman | G06F 9/505 |
| | | | 718/102 |
| 2015/0294200 A1* | 10/2015 | Ito | G06K 15/1809 |
| | | | 358/1.15 |
| 2017/0013139 A1* | 1/2017 | Suzuki | H04N 1/0023 |

OTHER PUBLICATIONS

Patrick Moratori et al., Integrating Rush Orders Into Existent Schedules for a Complex Job Shop Problem; Appl Intell 2010.

* cited by examiner

SCHEDULING HIGH PRIORITY PRINT JOBS WITH MINIMAL PRINT WASTE

FIELD

This disclosure relates to the field of production printing systems and, in particular, to scheduling high priority print jobs with minimal print waste.

BACKGROUND

High-speed production printers typically include a print controller that includes a print data path from a job storage system that spools print jobs to one or more print engines (also referred to as an "imaging engine" or as a "marking engine"). The print data path includes several components that process the print jobs to prepare pages for printing. Examples of components include a segmenter to segment a print job into pages, a layout master to create sheetsides, a rasterizer to rasterize the sheetsides into bitmaps, and a mechanism module to dispatch the sheet bitmaps (i.e., front and/or back sheetsides) to a print engine that physically marks paper using the sheetside bitmaps.

The components along the print data path may have queues to temporarily store data in memory for performing its job processing functions. As processing operations are completed, the data is forwarded down the print data path to the next component and queue, and the queues are continually depleted and refreshed in this manner as print jobs are processed in the print controller. To maintain printing at a high-speed, the print controller keeps the print data path sufficiently full with data such that the last queue feeding the print engine is able to continually feed the print engine with sheets at a fast rate. If the queue feeding the print engine runs empty, a condition known as a "back hitch" may occur in which the print engines stop printing and/or unintended blank pages fill the paper path and exit the printer.

In current print systems, when a user designates a print job as having a high priority (e.g., to print it soon at the expense of other previously submitted print jobs in various stages of processing in the print controller), it is necessary to clear the queues of the print data path to make room for processing the high priority print job. As such, when a high priority print job is detected, the print data path is immediately cleared to make way for the high priority print job. However, immediately cancelling a print job and clearing its data from the print data path means that the queues are emptied. Therefore, scheduling a high priority print job in current high-speed print systems often means creating a back hitch condition and wasting a significant amount of paper.

SUMMARY

Embodiments described herein provide for scheduling high priority print jobs with minimal paper waste. The print controller checks for a high priority print job after confirming that the last queue feeding the print engine has a sufficient amount of data such that it does not become empty by the time print data of the high priority print job begins reaching the last queue. If this condition is met and there is a high priority print job waiting to begin processing, the print controller partially clears the print data path by erasing data from the intermediate queues up to the last queue (i.e., excluding the last queue from erasure). Therefore, the high priority print job can begin processing soon while avoiding the back hitch condition. Furthermore, the last job placed in the last queue is allowed to complete, and thus the print controller waits to clear the print data path until there is no more data in it that contributes to the last job in the last queue.

One embodiment is a printing system that includes a job storage system configured to receive a plurality of print jobs from at least one host system, and to store the plurality of print jobs. The printing system also includes a print controller having a print data path from the job storage system to at least one print engine of the printing system, the print data path including one or more intermediate queues to temporarily store data of one or more print jobs for processing by the print controller, the print data path further including a last queue to temporarily store print ready bitmap data from at least one print job prior to dispatching the print ready bitmap data to the at least one print engine for imaging. The print controller configured to monitor the last queue to determine an estimate time for printing the print ready bitmap data stored in the last queue, to determine whether the estimate time exceeds a time threshold, and to determine whether a high priority print job is detected in the job storage system. The print controller further configured, in response to determining that the estimate time exceeds the time threshold and detecting the high priority print job, to halt processing of at least one of the plurality of print jobs that is not the high priority print job, and to advance processing of the high priority print job on the print data path.

Other illustrative embodiments (e.g., methods and computer-readable media relating to the foregoing embodiments) may be described below. The features, functions, and advantages that have been discussed can be achieved independently in various embodiments or may be combined in yet other embodiments further details of which can be seen with reference to the following description and drawings.

DESCRIPTION OF THE DRAWINGS

Some embodiments of the present disclosure are now described, by way of example only, and with reference to the accompanying drawings. The same reference number represents the same element or the same type of element on all drawings.

DESCRIPTION

The figures and the following description illustrate specific illustrative embodiments of the disclosure. It will thus be appreciated that those skilled in the art will be able to devise various arrangements that, although not explicitly described or shown herein, embody the principles of the disclosure and are included within the scope of the disclosure. Furthermore, any examples described herein are intended to aid in understanding the principles of the disclosure, and are to be construed as being without limitation to such specifically recited examples and conditions. As a result, the disclosure is not limited to the specific embodiments or examples described below, but by the claims and their equivalents.

Figure 1:
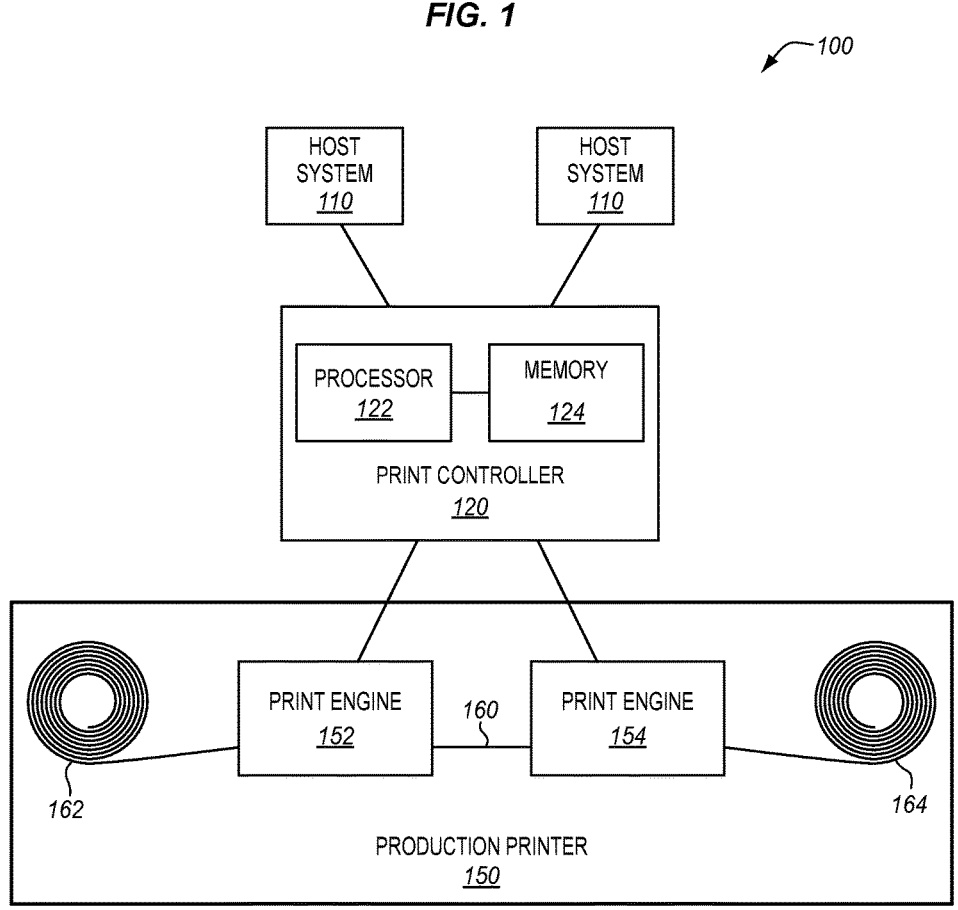
FIG. 1 illustrates a production printing system in an illustrative embodiment.

FIG. 1 illustrates a printing system 100 in an illustrative embodiment. The printing system 100 includes one or more host system(s) 110, a print controller 120, and a printer 150. The printer 150 may comprise a high-speed printer used for volume printing, such as 100 pages per minute or more. The printer 150 includes one or more print engines 152-154 to physically mark a print medium 160 (e.g., paper). In this example, the printer 150 is a continuous forms printer having an input paper roll 162, a first print engine 152 (e.g., that prints on a front side of the print medium 160), a second print engine 154 (e.g., that prints on a back side of the print medium 160), and an output paper roll 164. It will be appreciated, however, that the concepts described herein may also apply to cut sheet printers and alternative production printers having various architectures, finishing devices, etc.

The print controller 120 generally interfaces with the host systems 110 to receive print jobs, and prepares the print jobs for printing on the print engines 152-154. To perform functions, the print controller 120 may be implemented by a processor 122 communicatively coupled to a memory 124. The processor 122 includes any electronic circuits and/or optical circuits that are able to perform functions. For example, the processor 122 may include one or more Central Processing Units (CPUs), Graphics Processing Units (GPUs), microprocessors, Digital Signal Processors (DSPs), Application-specific Integrated Circuits (ASICs), Programmable Logic Devices (PLDs), control circuitry, etc. Some examples of processors include INTEL® CORE™ processors, Advanced Reduced Instruction Set Computing (RISC) Machines (ARM®) processors, etc. The memory 124 includes any electronic circuits, optical circuits, and/or magnetic circuits that are able to store data. For instance, the memory 124 may include one or more volatile or non-volatile Dynamic Random Access Memory (DRAM) devices, FLASH devices, volatile or non-volatile Static RAM (SRAM) devices, magnetic disk drives, Solid State Disks (SSDs), etc. Some examples of non-volatile DRAM and SRAM include battery-backed DRAM and battery-backed SRAM.

Figure 2:
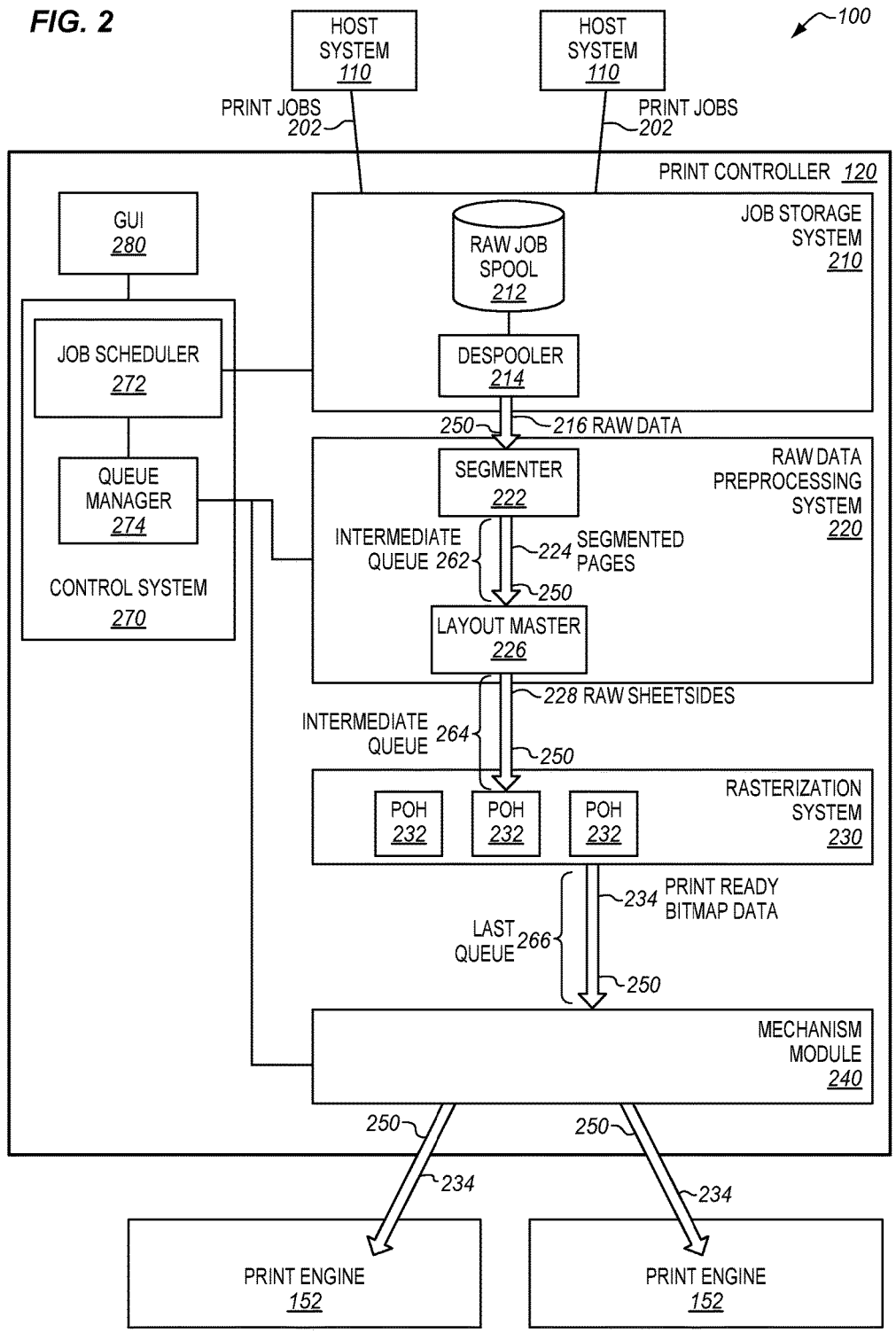
FIG. 2 is a block diagram of a printing system in an illustrative embodiment.

FIG. 2 is a block diagram of a printing system 100 in an illustrative embodiment. As shown in FIG. 2, the print controller 120 may include a job storage system 210, a raw data preprocessing system 220, an rasterization system 230, and a mechanism module 240. The job storage system 210 comprises any system, device, or component operable to receive print jobs 202 from one or more of the host systems 110, and store the print jobs 202 in a raw job spool 212. The print jobs 202 may optionally include job tickets and so for ease of reference, the print jobs 202 may refer to print jobs with or without corresponding job tickets. The job storage system 210 also includes a despooler 214 to retrieve a print job from the raw job spool 212 and forward the raw data 216 for the print job to the raw data preprocessing system 220 along a print data path 250.

The raw data preprocessing system 220 comprises any system, device, or component operable to receive the raw data 216 for the print jobs 202, and perform preprocessing on the raw data 216 before the print jobs 202 are interpreted. In this embodiment, the raw data preprocessing system 220 includes a segmenter 222 to segment the print jobs 202 into segmented pages 224, and a layout master 226 to create raw sheetsides 228 based on the segmented pages 224. The layout master 226 may thus include layout functionalities to assemble the segmented pages 224 into raw sheetsides 228. The segmenter 222 forwards data to the layout master 226 via an intermediate queue 262 on the print data path 250. Similarly, the layout master 226 forwards data to the rasterization system 230 via an intermediate queue 264 on the print data path 250.

The rasterization system 230 comprises any system, device, or component operable to interpret, render, rasterize, or otherwise convert the raw sheetsides 228 for print jobs into print ready bitmap data 234 for the print jobs. As such, the rasterization system 230 may include one or more Page Object Handlers (POHs) 232 operable to render the raw sheetsides 228 to generate the print ready bitmap data 234. The POHs 232 may render multiple raw sheetsides 228 concurrently so that the rate of rendering substantially matches the rate of imaging of production print engines. The rasterization system 230 may forward the print ready bitmap data 234 along a last queue 266 of the print data path 250 to the mechanism module 240.

The mechanism module 240 comprises any system, device, or component operable to control the transfer of the print ready bitmap data 234 to the print engines 152-154 for subsequent printing. Generally, the print ready bitmap data 234 that is transferred from the last queue 266 causes one of print engines 152-154 to which it has been sent to print based on the print ready bitmap data 234 it has received. As such, the last queue 266 is generally the last queue on the print data path 250 that stores print data before the print data is used for physically marking the print media. The mechanism module 240 may attempt to pull a sheet out of the last queue 266, and if there are none (i.e., the last queue 266 is empty), the mechanism module 240 may issue a stop command, potentially causing a back hitch. Moreover, if the print engines 152-154 are full, the mechanism module 240 may temporarily pause transfer of the print ready bitmap data 234 to wait for a sheet to finish sending to the print engines 152-154, and then pull the next sheet from the last queue 266. Although a particular architecture of the print controller 120 is shown and described with respect to FIG. 2 for purposes of discussion, it will be appreciated that alternative architectures are possible, including alternative component and queue configurations. For example, the print controller 120 may include other intermediate queues in addition to or instead of the intermediate queues 262-264 of the segmenter 222 and the layout master 226, and the last queue 266 may be part of alternative components or devices (e.g., the print engines 152-154) that are controllable by the print controller 120. The print controller 120 and the print engines 152-154 may both be implemented in the same printing system 100 or may be implemented separately and coupled together.

To coordinate overall operation, the print controller 120 includes a control system 270 that is enhanced with a job scheduler 272 and a queue manager 274. The job scheduler 272 is configured to detect a high priority print job in the job storage system 210, and to schedule the high priority job such that it prints at the print engines 152-154 soon with minimal paper waste and printing downtime. The queue manager 274 is configured to manage and prepare queues of the print data path 250 (e.g., the intermediate queues 262-264 and the last queue 266) for the suitable conditions that enable scheduling and processing a high priority print job without causing paper waste and printing delay. Alternatively or additionally, the queue manager 274 may halt processes performed in the print data path 250 (e.g. those processes performed by the segmenter 222, the layout master 226 and/or the POH 232). Generally, the job scheduler 272 and the queue manager 274 coordinate to avoid depleting the print data path 250 in processing a high priority print job. That is, instead of immediately clearing all queues of the print data path 250 or interrupting print jobs mid-job, the control system 270 may wait before initializing the high priority print job to ensure that the print data path 250, exclusive of last queue 266, does not contain any portions of a print job currently in the last queue 266. The print controller 120 may implement or interface with a graphical user interface (GUI) 280 of the printing system 100 that enables user input (e.g., via keyboard, mouse, display screen, etc.) indicating a maximum period of time of waiting so that high priority print jobs may be scheduled according a user's preferences for printing soon performance. Illustrative details of the operation of the print controller 120 will be discussed with regard to FIG. 3.

Figure 3:
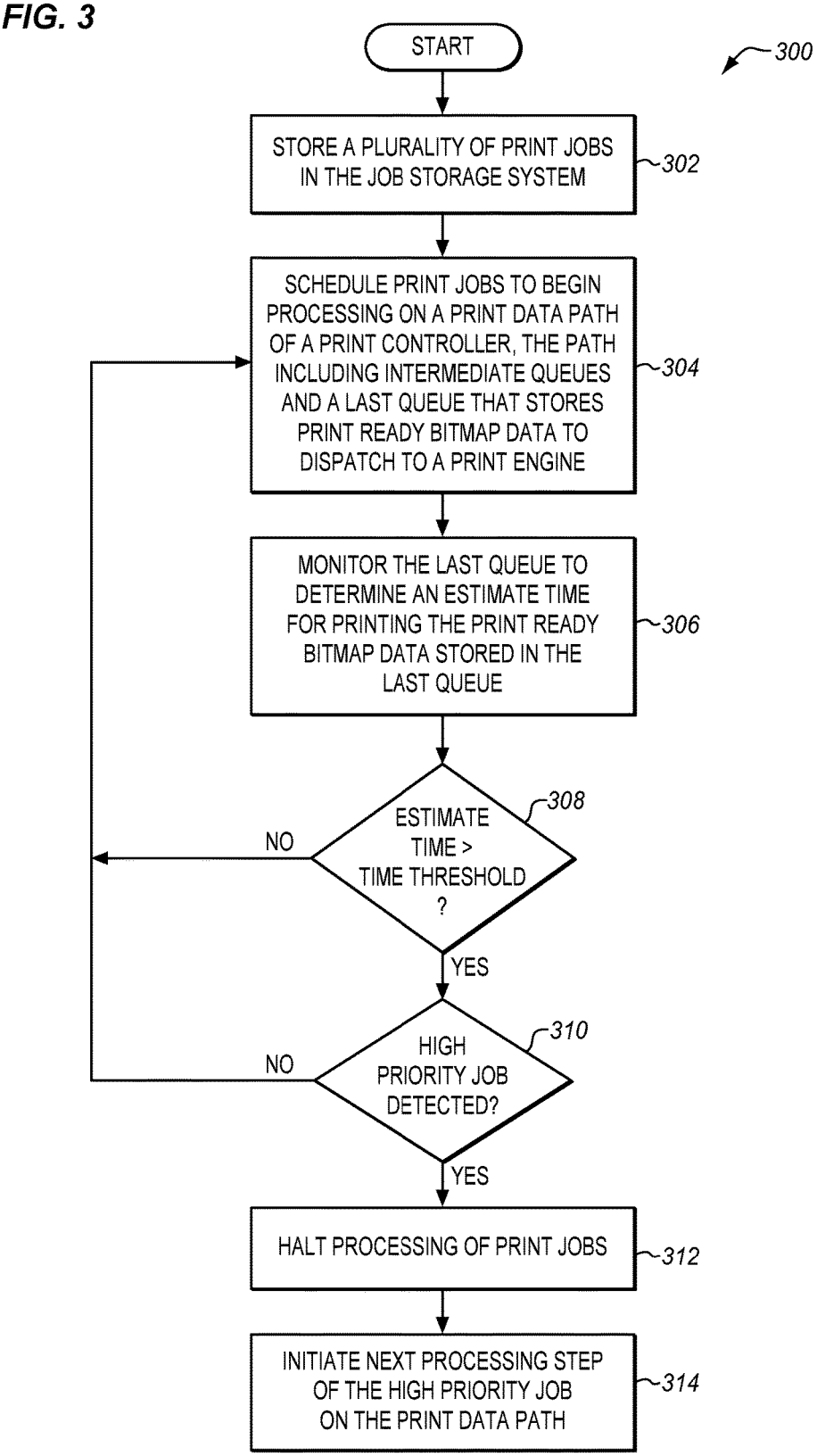
FIG. 3 is a flowchart illustrating a method for scheduling a high priority print job in an illustrative embodiment.

FIG. 3 is a flowchart illustrating a method 300 for scheduling a high priority print job in an illustrative embodiment. The steps of the flowcharts are described with reference to the print controller 120 of FIGS. 1 and 2, but those skilled in the art will appreciate the methods may be performed in other systems. The steps described herein are not all inclusive, may include other steps not shown, and may be performed in alternative orders.

In step 302, the job storage system stores print jobs. In step 304, the job scheduler 272 schedules print jobs to begin processing on a print data path 250 of the print controller 120. As described above with respect to FIG. 2, the print data path 250 includes one or more intermediate queues 262-264 to temporarily store data of one or more print jobs for processing by the print controller 120. Additionally, the print data path 250 includes the last queue 266 to temporarily store the print ready bitmap data 234 of at least one print job prior to dispatching to at least one of the print engines 152-154 for imaging.

In step 306, the queue manager 274 monitors the last queue 266 to determine an estimate time for printing the print ready bitmap data 234 stored in the last queue 266. The queue manager 274 may estimate the time to finish printing based on a number of remaining sheets of a print job which are stored in the last queue 266, a number of copies to be printed, and/or a speed of the printer (e.g., a rated speed of the print engines 152-154).

In step 308, the queue manager 274 determines whether the estimate time exceeds a time threshold. The time threshold may be received via user input to the GUI 280. If the estimate time does not exceed the time threshold, the method 300 may return to step 304 and repeat steps 304-308. In doing so, the job scheduler 272 may instruct the despooler 214 to retrieve print data according to a normal order of print job processing. Otherwise, if the estimate time does exceed the time threshold, the method 300 may proceed to step 310.

In step 310, the job scheduler 272 determines whether a high priority print job is detected in the print data path 250. The priority level of a print job may be indicated by a user via the GUI 280. Alternatively, the priority level of a print job may be indicated in a print job ticket or set via a user of the host systems 110. If a high priority print job is not detected in the job storage system 210, the method 300 may return to step 304 and repeat steps 304-310, thereby allowing already scheduled jobs to keep being processed, since the print data path 250 may have multiple jobs in processing at a time. Otherwise, if a high priority print job is detected in the job storage system 210, the method 300 proceeds to step 312.

In step 312, the queue manager 274 halts the processing of at least one print job of the plurality of print jobs in the print path 250 without clearing the last queue 266. Further, the halting is done without halting the processing of the high priority print job. Further still, halting the processing may include any combination of erasing (e.g. purging or clearing) at least some data currently associated with the at least one print job and interrupting at least some processes currently associated with the at least one print job. Data associated with the at least one print job may include data stored in the intermediate queues 262-264, processes, other hardware devices, and other software applications in print data path 250. Processes associated with the at least one print job may include processes in the print data path 250. Examples of processes in data path 250 include the segmenter 222, the layout master 226, and POH 232. Then, in step 314, the job scheduler 272 initiates the next processing step of the high priority print job on the print data path 250. In performing the method 300, the control system 270 is able to confirm that the last queue 266 has sufficient data before halting the processing of the at least one print job to allow for the high priority print job to advance along the print data path 250. The method 300 provides a benefit over prior techniques for scheduling high priority print jobs because the high priority print job can begin or continue processing on the print data path 250 without allowing the last queue 266 to empty.

Figure 4:
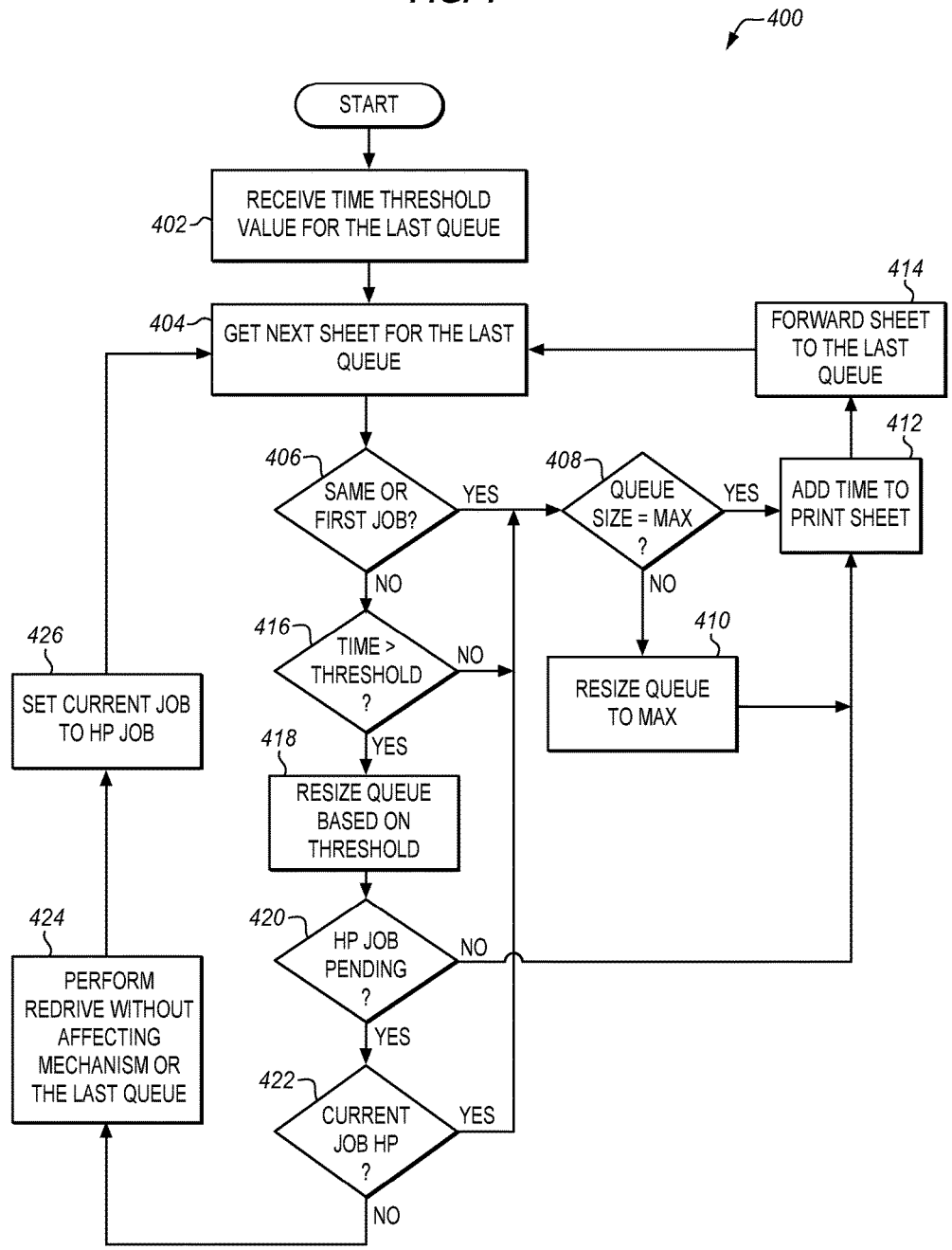
FIG. 4 is a flowchart illustrating a method for scheduling a high priority print job in another illustrative embodiment.

FIG. 4 is a flowchart illustrating a method 400 for scheduling a high priority print job in another illustrative embodiment. The steps of the flowcharts are described with reference to the print controller 120 of FIGS. 1 and 2, but those skilled in the art will appreciate the methods may be performed in other systems. The steps described herein are not all inclusive, may include other steps not shown, and may be performed in alternative orders.

Figure 5:
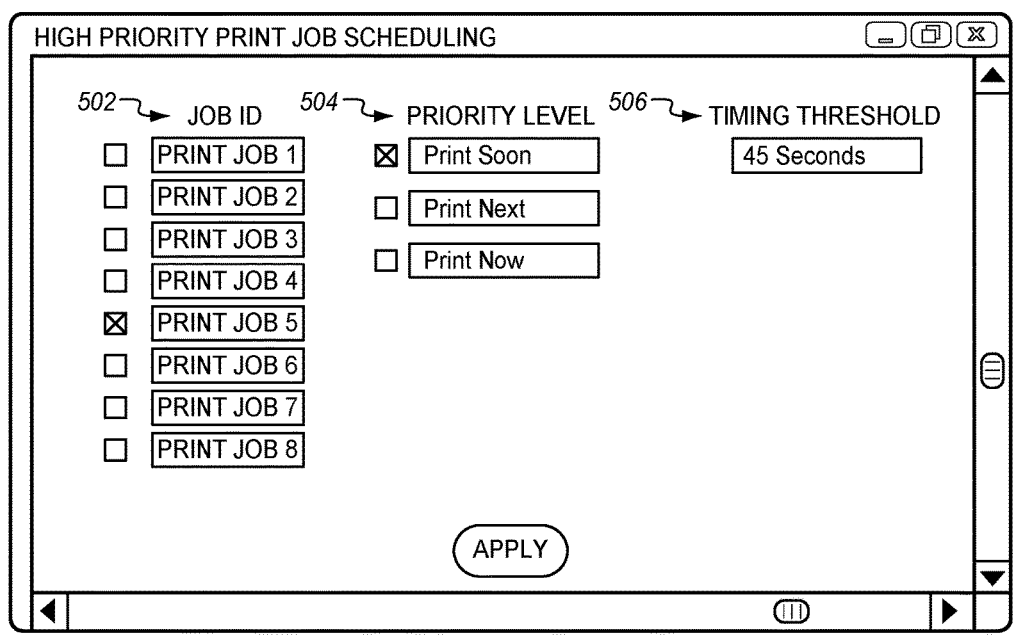
FIG. 5 illustrates a graphical user interface for receiving user input for a high priority print job in an illustrative embodiment.

In step 402, the control system 270 receives a time threshold value for the last queue 266. Alternatively, control system 270 receives user input (e.g., via GUI 280) indicating a time threshold value for the last queue 266. FIG. 5 illustrates a graphical user interface 500 for receiving user input for a high priority print job in an illustrative embodiment. As shown in FIG. 5, a user may select a print job in the job storage system 210 having a job identifier 502, and designate a priority level 504 and/or a timing threshold 506 for the selected print job. More particularly, the user may select to "print now" to immediately begin processing the selected print job, to "print next" to schedule the selected print job at a job boundary (i.e., to begin immediately after the current job finishes, along with all copies), or to "print soon" to schedule the selected print job without disrupting the printing that is already in progress. Assume, for this example, that the user has selected the priority level 504 of print soon and selected the timing threshold 506 value as 45 seconds via GUI 280.

Returning to FIG. 4, in step 404, the print controller 120 gets the next sheet to examine. That is, the print controller 120 in operation continues to rasterize sheets of print jobs 202 and forward those sheets along the print data path 250. In step 406, the control system 270 determines whether the potential sheet is part of the same print job in last queue 266 or a first print job. If so, the method 400 proceeds to step 408 and the control system 270 determines whether the size of the last queue 266 is a maximum size. If the size of the last queue 266 is not maximum, the method 400 proceeds to step 410 to resize the last queue 266 to its maximum size.

Otherwise, if the last queue 266 size is already its maximum (in step 408) or it has been resized (in step 410), the method 400 proceeds to step 412 and the control system 270 adds the time to print the sheet (including time to print copies of the sheet) to the estimate of time to print last queue 266. Then, in step 414, the control system 270 forwards the sheet on to the last queue 266. That is, the control system 270 may attempt to put the sheet on the last queue 266, and if the last queue 266 is full, the attempt completes after a sheet is removed from the last queue 266 by the mechanism module 240. In this way, the control system 270 may update and track the estimate time for printing contents of the last queue 266 as sheets are added to the last queue 266. The method 400 may then return to step 404 for the next sheet.

If, in step 406, the control system 270 determines that the sheet is not part of the same print job in last queue 266 and not part of the first print job, the method 400 proceeds to step 416. In other words, a negative output of step 406 may indicate a job boundary has been determined. In step 416, the control systems 270 determines whether the estimate time for printing the last queue 266 is greater than a time threshold. For instance, in continuing with the example above, the control system 270 may determine whether the last queue 266 contains greater than 45 seconds of printing time. If not, the method 400 proceeds to step 408 such that the size of the last queue 266 may be reset to normal maximum and the print controller 120 can proceed unimpeded until the next job boundary. Otherwise, if in step 416 the control system 270 determines that the estimate time for printing the last queue 266 is greater than the time threshold, the method proceeds to step 418.

In step 418, the control system 270 resizes the last queue 266 based on the time threshold. For example, the queue manager 274 may restrict the number of entries of the last queue 266 according to the estimate time to finish printing contents of the last queue 266. In other words, the queue manager 274 may resize the last queue 266 to the number of sheets last put on the last queue 266 whose times exceed the time threshold. This temporarily prevents a subsequent job from being placed on the last queue 266. Then, in step 420, the control system 270 determines whether a high priority print job is pending in the job storage system 210. If not, the method 400 returns to step 412-414, where the estimate time for printing sheet is added to the estimate time and the control system 270 may attempt to put the sheet into the last queue 266, and the method 400 repeats beginning at step 404. If a high priority print job is pending in step 420, the method 400 proceeds to step 422.

In step 422, the control system 270 determines whether the print job is pending for the last queue 266 is the requested high priority print job. If so, the method 400 returns to step 408 so that the control system 270 may reset the last queue 266 to its normal maximum size and the print controller 120 can proceed unimpeded until the next job boundary. Otherwise, the method 400 proceeds to step 424 and the control system 270 performs a redrive without affecting the mechanism module 240 or the last queue 266. In doing so, the queue manager 275 halts the processing of at least one print job of the plurality of print jobs in the print path 250 without clearing the last queue 266 and without halting the processing of the high priority print job. Further by doing so, the queue manager 274 may set aside the in-process job data by clearing out the intermediate queues 262-264 to make room for the high priority print job to be processed. In some embodiments, the queue manager 274 may perform a modified redrive operation in which queues of the print data path 250 are erased (e.g. cleared) excluding erasure of the last queue 266 on the print data path 250. As such, the high priority print job may be processed and printed without waste or delay. In other embodiments, the queue manager 274 may find an alternate print data path and process the high priority print job in parallel, pausing (e.g., halting) the normal next print job until after the high priority print job completes. Alternatively or additionally, the queue manager 274 may interrupt at least some processes currently associated with the at least one print job.

In step 426, the control system 270 sets the high priority print job as the current job. Accordingly, as the method 400 returns to step 404, the print controller 120 may continue to process the high priority print job unimpeded (e.g., via steps 406-414) until the next job boundary. Unimpeded, in this context, means that the last queue 266 is maintained at its normal, maximum capacity during processing of a print job. In using the method 400, the control system 270 resizes the last queue 266 on-the-fly to ensure that the next print job is not put on the last queue 266 before the high priority print job is allowed to be started and begins to reach the last queue 266. By resizing the last queue 266 to a smaller number of entries than are already in the last queue 266, the control system 270 temporarily prevents a subsequent job from reaching the last queue 266 while it determines if there are any high priority print jobs to schedule. If there is sufficient room on the last queue 266 to ensure a back hitch condition is not created, either the next print job may be continued (if there is no high priority print job pending) or the high priority print job may be started. After a print job starts, the control system 270 may allow that print job to complete even if a high priority print job becomes pending, and the control system 270 may schedule the high priority print job to print as soon as possible yet after the last job in the last queue 266 completes placement on the last queue 266. However, if the last queue 266 is insufficient, jobs may continue to be passed down the print data path 250 in front of the high priority print job. The control system 270 may interrupt the print data path 250 with the high priority print job after the last queue 266 is determined to have enough data to keep the print engines 152-154 running.

Moreover, if a high priority print job is present before a new entry is allowed on the last queue 266, the data on the print data path 250 up to the last queue 266 may be discarded and the high priority print job may begin processing in the print controller 120 on the print data path 250. Accordingly, in the method 400, print jobs are held back from entering the print data path 250 for a time threshold maximum period of time to allow for insertion of a high priority print job without causing a back hitch condition. If the time threshold allows more time, the last queue 266 may become larger and allow more jobs (e.g., several minutes of printing time). That is, the time for printing contents of the last queue 266 is increased thereby reducing the probability of a back hitch. However, since jobs are not terminated after reaching the last queue 266, this may increase the chance that a high priority print job is further delayed. Therefore, the user may set the time threshold according to a desired balance of reducing the time to begin processing a high priority print job versus reducing the chance that a back hitch is created.

Figure 6:
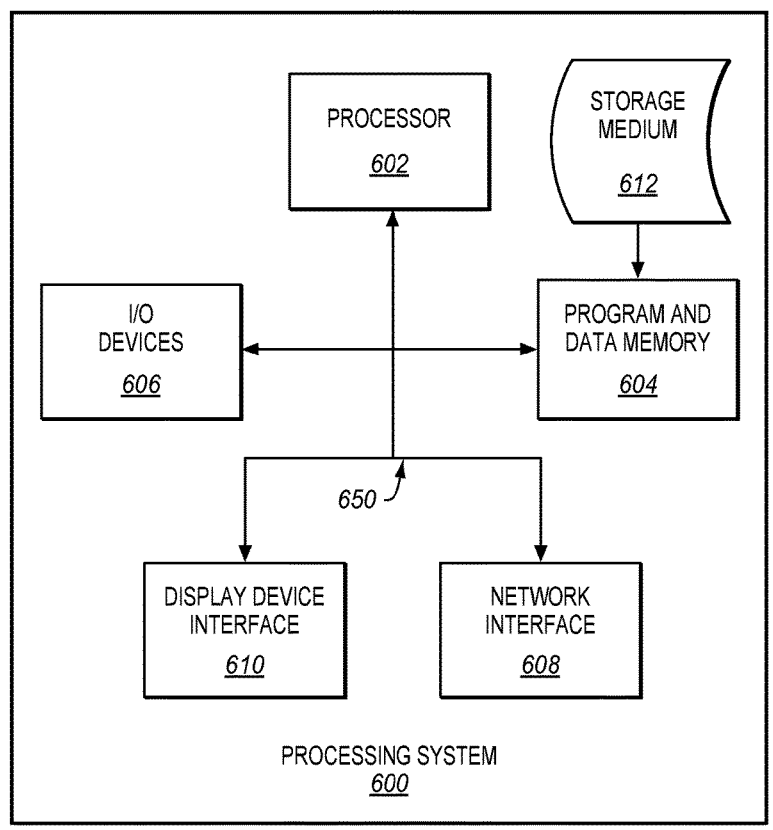
FIG. 6 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of the print controller 120 to perform the various operations disclosed herein. FIG. 6 illustrates a processing system 600 operable to execute a computer readable medium embodying programmed instructions to perform desired functions in an illustrative embodiment. Processing system 600 is operable to perform the above operations by executing programmed instructions tangibly embodied on computer readable storage medium 612. In this regard, embodiments of the invention can take the form of a computer program accessible via computer-readable medium 612 providing program code for use by a computer or any other instruction execution system. For the purposes of this description, computer readable storage medium 612 can be anything that can contain or store the program for use by the computer.

Computer readable storage medium 612 can be an electronic, magnetic, optical, electromagnetic, infrared, or semiconductor device. Examples of computer readable storage medium 612 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 600, being suitable for storing and/or executing the program code, includes at least one processor 602 coupled to program and data memory 604 through a system bus 650. Program and data memory 604 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 606 (including but not limited to keyboards, displays, pointing devices, etc.) can be coupled either directly or through intervening I/O controllers. Network adapter interfaces 608 may also be integrated with the system to enable processing system 600 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 610 may be integrated with the system to interface to one or more display devices, such as printing systems and screens for presentation of data generated by processor 602.

Although specific embodiments are described herein, the scope of the disclosure is not limited to those specific embodiments. The scope of the disclosure is defined by the following claims and any equivalents thereof.

What is claimed is:

1. A printing system comprising:
a job storage system configured to receive a plurality of print jobs from at least one host system, and to store the plurality of print jobs; and
a print controller that includes a print data path from the job storage system to at least one print engine of the printing system, the print data path including one or more intermediate queues to temporarily store data of one or more print jobs for processing by the print controller, the print data path further including a last queue to temporarily store print ready bitmap data from at least one print job prior to dispatching the print ready bitmap data to the at least one print engine for imaging;
the print controller configured to monitor the last queue to determine an estimate time for printing the print ready bitmap data stored in the last queue, to determine whether the estimate time exceeds a time threshold, and to determine whether a high priority print job is detected in the job storage system; and
the print controller configured, in response to determining that the estimate time exceeds the time threshold and detecting the high priority print job, to halt processing of at least one of the plurality of print jobs that is not the high priority print job, and to advance processing of the high priority print job on the print data path.

2. The printing system of claim 1 wherein:
the print controller is configured, in response to determining that the estimate time exceeds the time threshold, to temporarily prevent additional data from subsequent print jobs from entering the last queue.

3. The printing system of claim 2 wherein:
the print controller is configured to temporarily prevent the additional data from entering the last queue by resizing the last queue to restrict the additional data based on the time threshold.

4. The printing system of claim 1 wherein the printing system includes a graphical user interface configured to receive user input indicating the time threshold.

5. The printing system of claim 1 wherein:
the print controller is configured to halt processing by erasing at least some data stored in the one or more intermediate queues by performing a redrive operation on the print data path that is modified to exclude erasure of the last queue on the print data path.

6. The printing system of claim 1 wherein:
the print controller is configured to determine the estimate time for printing the print ready bitmap data based on a number of sheets stored in the last queue and a printing speed of the printing system.

7. The printing system of claim 1 further comprising:
a printer that includes the at least one print engine and is configured to mark a print medium based on the print ready bitmap data received from the print controller.

8. A method of scheduling a high priority print job with a print controller of a printing system, wherein the print controller includes a print data path from a job storage system to at least one print engine of the printing system, the print data path including one or more intermediate queues to temporarily store data of one or more print jobs for processing by the print controller, the print data path further including a last queue to temporarily store print ready bitmap data from at least one print job prior to dispatching the print ready bitmap data to the at least one print engine for imaging, the method comprising:
storing a plurality of print jobs in the job storage system;
monitoring the last queue to determine an estimate time for printing the print ready bitmap data stored in the last queue;
determining whether the estimate time exceeds a time threshold;
determining whether a high priority print job is detected in the job storage system; and
responsive to determining that the estimate time exceeds the time threshold and detecting the high priority print job;
halting processing of at least one of the plurality of print jobs that is not the high priority print job; and
advancing processing of the high priority print job on the print data path.

9. The method of claim 8 further comprising:
in response to determining that the estimate time exceeds the time threshold, temporarily preventing additional data from subsequent print jobs from entering the last queue.

10. The method of claim 9 further comprising:

temporarily preventing the additional data from entering the last queue by resizing the last queue to restrict the additional data based on the time threshold.

11. The method of claim 8 further comprising:

receiving user input indicating the time threshold.

12. The method of claim 8 further comprising:

halting processing by erasing at least some data stored in the one or more intermediate queues by performing a redrive operation on the print data path that is modified to exclude erasure of the last queue on the print data path.

13. The method of claim 8 further comprising:

determining the estimate time for printing the print ready bitmap data based on a number of sheets stored in the last queue and a printing speed of the printing system.

14. A non-transitory computer readable medium embodying programmed instructions which, when executed by a processor, are operable for performing a method of scheduling a high priority print job with a print controller of a printing system, wherein the print controller includes a print data path from a job storage system to at least one print engine of the printing system, the print data path including one or more intermediate queues to temporarily store data of one or more print jobs for processing by the print controller, the print data path further including a last queue to temporarily store print ready bitmap data from at least one print job prior to dispatching the print ready bitmap data to the at least one print engine for imaging, the method comprising:

storing a plurality of print jobs in the job storage system;

monitoring the last queue to determine an estimate time for printing the print ready bitmap data stored in the last queue;

determining whether the estimate time exceeds a time threshold;

determining whether a high priority print job is detected in the job storage system; and responsive to determining that the estimate time exceeds the time threshold and detecting the high priority print job;

halting processing of at least one of the plurality of print jobs that is not the high priority print job; and advancing processing of the high priority print job on the print data path.

15. The medium of claim 14, the method further comprising:

in response to determining that the estimate time exceeds the time threshold, temporarily preventing additional data from subsequent print jobs from entering the last queue.

16. The medium of claim 15, the method further comprising:

temporarily preventing the additional data from entering the last queue by resizing the last queue to restrict the additional data based on the time threshold.

17. The medium of claim 14, the method further comprising:

receiving user input indicating the time threshold.

18. The medium of claim 14, the method further comprising:

halting processing by erasing at least some data stored in the one or more intermediate queues by performing a redrive operation on the print data path that is modified to exclude erasure of the last queue on the print data path.

19. The medium of claim 14, the method further comprising:

determining the estimate time for printing the print ready bitmap data based on a number of sheets stored in the last queue and a printing speed of the printing system.

20. The medium of claim 14, the method further comprising:

marking a print medium with a printer that uses the print ready bitmap data received from the print controller.

* * * * *